May 26, 1964 R. W. WILSON 3,134,583
APPARATUS FOR BULK CURING TOBACCO
Original Filed Sept. 22, 1961 5 Sheets-Sheet 1

INVENTOR
ROBERT W. WILSON

BY Cushman, Darby & Cushman

ATTORNEYS

May 26, 1964  R. W. WILSON  3,134,583
APPARATUS FOR BULK CURING TOBACCO
Original Filed Sept. 22, 1961  5 Sheets-Sheet 2

INVENTOR
ROBERT W. WILSON
BY Cushman, Darby & Cushman
ATTORNEYS

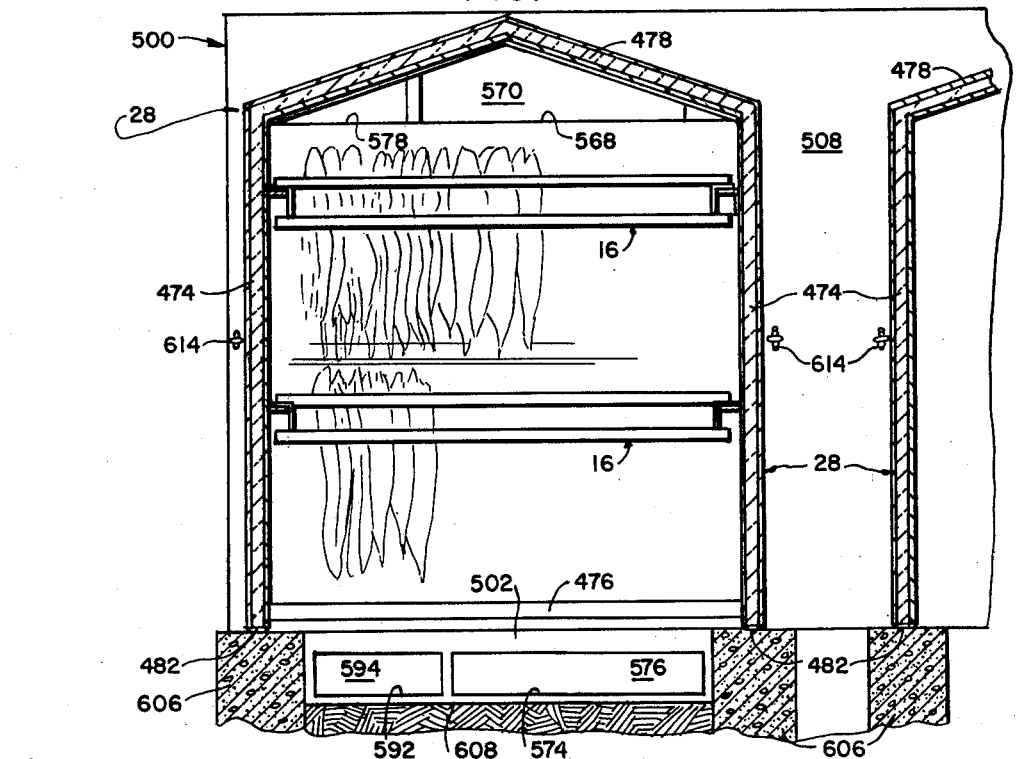
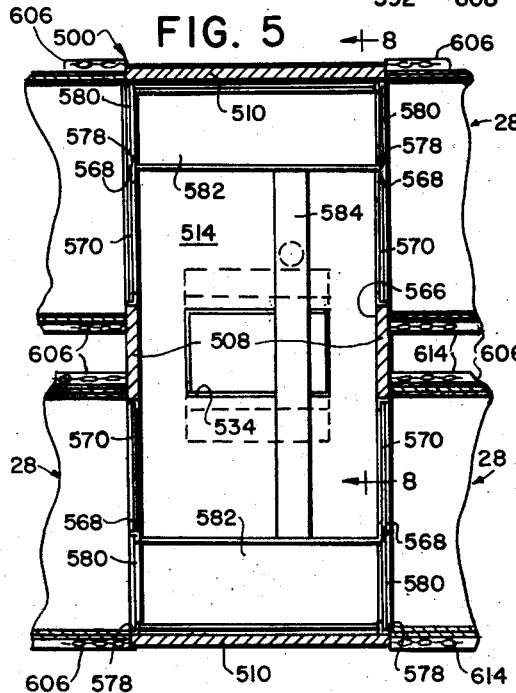
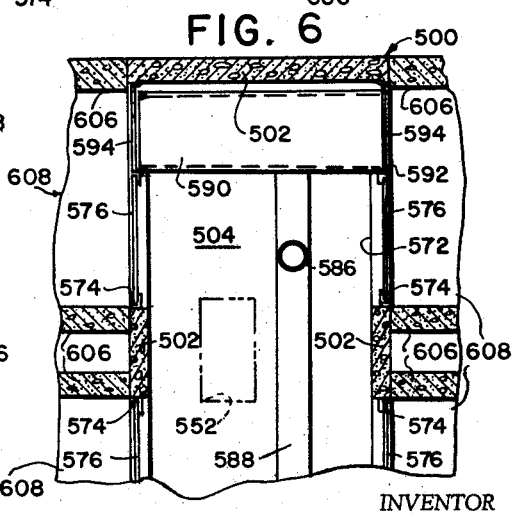

May 26, 1964 R. W. WILSON 3,134,583
APPARATUS FOR BULK CURING TOBACCO
Original Filed Sept. 22, 1961 5 Sheets-Sheet 4

INVENTOR
ROBERT W. WILSON

BY Cushman, Darby & Cushman
ATTORNEYS

May 26, 1964   R. W. WILSON   3,134,583
APPARATUS FOR BULK CURING TOBACCO
Original Filed Sept. 22, 1961   5 Sheets-Sheet 5
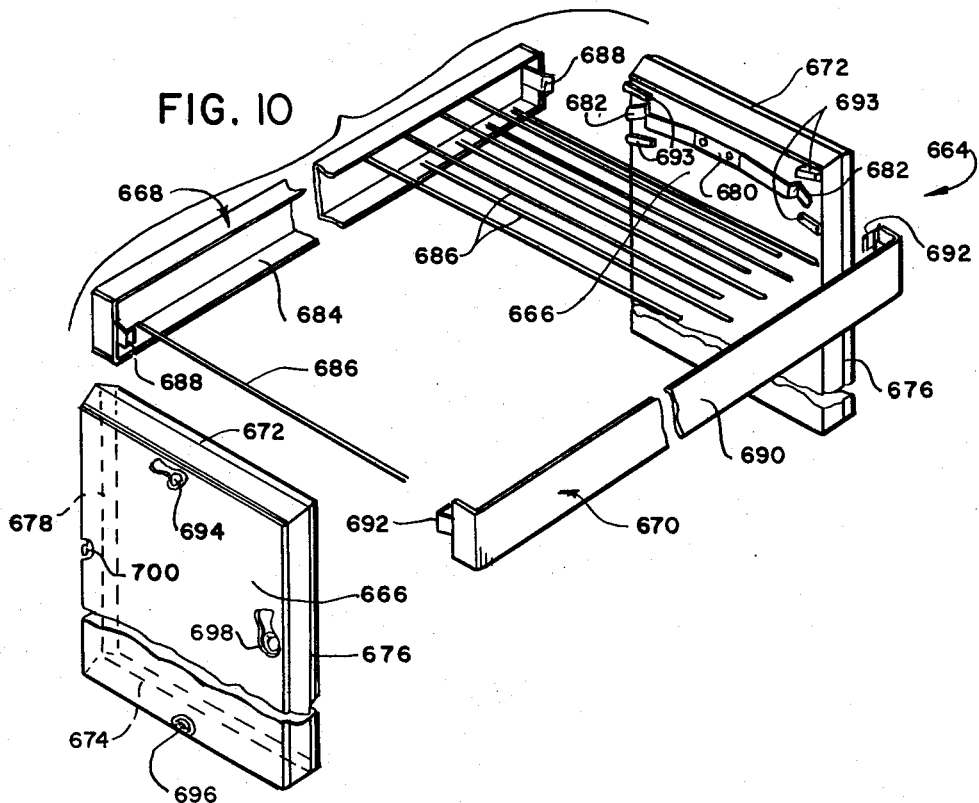
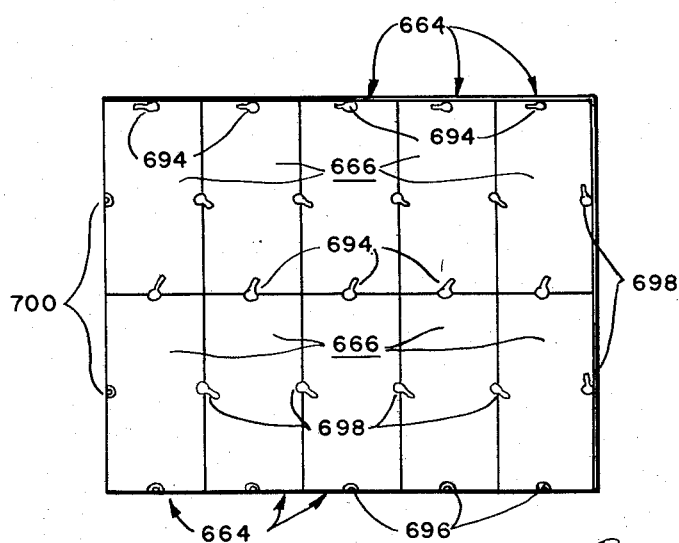
INVENTOR
ROBERT W. WILSON
BY Cushman, Darby + Cushman
ATTORNEYS

United States Patent Office 3,134,583
Patented May 26, 1964

3,134,583
APPARATUS FOR BULK CURING TOBACCO
Robert W. Wilson, Charlotte, N.C., assignor to R. H. Bouligny, Inc., Charlotte, N.C., a corporation of North Carolina
Original application Sept. 22, 1961, Ser. No. 140,026, now Patent No. 3,083,517, dated Apr. 2, 1963. Divided and this application June 5, 1962, Ser. No. 200,615
30 Claims. (Cl. 263—19)

This invention relates to the harvesting and curing of tobacco leaves and more particularly to improved apparatus for handling and curing tobacco leaves. This application is a division of my co-pending application Serial No. 140,026, filed September 22, 1961, which issued April 2, 1963, as Patent No. 3,083,517.

At the present time, tobacco of the bright leaf or flue cured type is handled to a large extent manually during the harvesting and curing operations. Bright leaf tobacco must be harvested at a particular time in the growing season and the leaves of the plant ripen at different times, the leaves progressively ripening from the bottom to the top on the stalk. The conventional practice is for "primers" to proceed through the field three or four times, and in each succeeding pass through the field the lowermost ripened leaves of the plants are removed by hand by the primer.

There have been proposals for replacing the conventional manual harvesting procedure with mechanisms capable of removing the ripe leaves from the plants by a mechanical action. Examples of mechanisms utilized for this purpose are found in Wilson Patents 2,816,411 and 2,834,173 and Wilson et al. Patent 2,834,174.

At present, mechanized harvesting of tobacco leaves has not been commercially adopted largely for the reason that no satisfactory system of mechanically handling the leaves thus harvested had been available. Conventionally, the primed leaves are handled manually by first placing them in bunches with their stems commonly aligned and tying these bunches, called "hands," by string or other instrumentality on elongated tobacco sticks. These sticks were then raised into supporting relation within a tobacco barn for curing in the conventional manner.

In recent years there has been proposed a system of handling tobacco leaves in substantial bulk form by the use of pronged racks. Examples of racks utilized for this purpose are disclosed in Wilson co-pending application Serial No. 116,368, filed June 12, 1961. A rack of the type disclosed in the above application is capable of handling approximately 130 pounds of leaves or the same quantity of leaves that were previously handled on approximately 8 to 13 tobacco sticks.

In conjunction with the use of these bulk handling racks curing of the leaves must be carried out in the presence of a forced circulation of heat and air, due to the great quantity of leaves per unit of volume within the barn.

The development of this system of handling and curing tobacco leaves in bulk form makes it commercially feasible for the first time to provide a true tobacco leaf harvesting mechanism capable not only of removing the leaves from the plants but of subsequently handling the mechanically harvested leaves so that they are in a condition to be moved directly into the curing barn without the necessity of further manual handling. The present application contemplates a true tobacco harvesting machine which might be more accurately termed a "combine," which is capable during movement through a tobacco field of mechanically removing the ripened leaves from the tobacco plants, conveying the removed leaves to a baling station where they are loaded in bulk form into and secured within bulk curing racks, and of handling a plurality of the filled racks so that they are retained in a position to be bodily moved into an existing curing barn and/or can be utilized to form a part of such barn.

An overall study of the entire operation of a tobacco farmer in getting his tobacco to the market place has shown that over a period of less than approximately 20 years, the man hours required to accomplish the overall operation including producing the plants, preparing land, transplanting, cultivating, controlling suckers and topping, harvesting and barning, curing, and marketing, has increased from approximately 408 man hours to approximately 426 man hours. The greatest increase in any one of the above-mentioned operations occurs in the harvesting and barning operation. The above figures are based upon the average man hours required to produce an acre of flue cured tobacco and the increase in man hours required in the harvesting and barning operation can be attributed primarily to the substantial increase in the amount of tobacco leaves that can be produced in an acre as compared with approximately 20 years ago. Indeed the man hours required in many of the operations have been reduced, particularly those dealing with the preparation of the land, cultivating and curing.

It is evident that with the increased cost of labor and the increased difficulties in obtaining the necessary labor at the critical times when it is required, indicate that a commercial apparatus capable of substantially reducing the man hours required in the harvesting and barning operation constitutes an acute need to tobacco farmers, a need which has existed for a considerable period of time. Indeed, conventional practices seem to indicate a resistance on the part of tobacco farmers to adopt mechanized procedures in those operations which have been commercially mechanized because of the preference to provide work for those laborers which are required during the harvesting season.

The present invention is more particularly concerned with novel improvements in the curing operation itself by making a more efficient use of a primary heating and air circulating source. In a normal curing operation the first step involves a chemical reaction within the leaves wherein they change to a yellow color. Very little movement of air and a relatively low temperature in the range of between 100–110° F. is required during this stage in the curing procedure. After the chemical reaction has taken place to a sufficient degree, the leaves are then dried by the application of considerably higher temperatures and a greater forced circulation of air. A typical drying temperature would be between 160–175° F. Thus, in any bulk curing operation there must be provided a source of circulating hot air capable of delivering the maximum required for the drying operation.

Accordingly, it is an object of the present invention to provide a tobacco curing barn apparatus capable of achieving the advantages set forth above.

Still another object of the present invention is the provision of tobacco curing barn apparatus which is capable of supporting a multiplicity of tobacco leaves in bulk form and of circulating a current of hot air therethrough in such a way as to obtain maximum efficiency from the heat source utilized to heat the circulating air.

Still nother object of the present invention is the provision of a tobacco curing barn apparatus having means for circulating the products of combustion of the heating source with the air heated by the source so as to reduce the heat losses to a minimum.

Another object of the present invention is the provision of a device which is capable of being dis-associated from the central heating and air circulating source and utilized in cooperation with the harvesting apparatus so as to greatly simplify the handling of the leaves in bulk form from the position of harvesting to the position of curing.

Still another object of the present invention is the provision of a rack of the type described providing wall means which serve to permit a plurality of such racks to be supported in vertically stacked relation and in horizontal end-to-end abutting relation, such wall means serving as a portion of the wall means of a curing barn structure.

These and other objects of the present invention will become more apparent during the course of the following detailed description and appended claims.

The invention may best be understood with reference to the accompanying drawings wherein an illustrative embodiment is shown.

In the drawings:

FIGURE 1 is a perspective view of a rack constructed in accordance with the present invention, showing the rack sections exploded in the position in which they are loaded and secured together;

FIGUURE 2 is a perspective view of the rack showing the rack sections secured together in the position in which they are handled and supported with the curing barn;

FIGURE 5 is an enlarged sectional view taken along the line 5—5 of FIGURE 4;

FIGURE 6 is an enlarged sectional view taken along the line 6—6 of FIGURE 4;

FIGURE 7 is an enlarged sectional view taken along the line 7—7 of FIGURE 3;

FIGURE 10 is an exploded perspective view of a tobacco leaf supporting rack of modified form; and FIGURE 11 is an elevational view of a plurality of racks secured together to form a portion of a curing barn section.

Referring now more particularly to the drawings, there is shown in FIGURES 1 through 9 thereof an apparatus for bulk curing tobacco leaves which, as shown, includes a plurality of bulk curing racks, generally indicated at 16, a plurality of rack supporting devices, generally indicated at 28, and a fixed curing barn housing section, generally indicated at 500.

Each rack 16 and rack supporting device 28 is particularly suited for use in conjunction with apparatus for mechanically defoliating tobacco leaves and mechanically handling the defoliated leaves in bulk form disclosed in Patent Number 3,083,517. In general, the apparatus of the patent comprises a vehicle frame which is preferably of the self-propelled type capable of movement through a field of mature tobacco. The vehicle frame provides a lower defoliating station at which the leaves of the plants are removed during the movement of the vehicle frame through the field, an upper forwardly positioned leaf baling station at which the removed leaves are secured within the bulk curing racks 16, and an upper rearwardly positioned rack handling station at which the loaded racks are handled for purposes of storage and facilitation of their subsequent transportation to a remote curing station for curing of the tobacco supported therein.

The preferred apparatus includes a defoliating mechanism carried by the vehicle frame at the defoliating station thereof for vertical movement with respect to the vehicle frame into different positions of vertical adjustment depending upon the position of the leaves to be defoliated on the tobacco stalks within the field. Mounted for vertical movement with the defoliating mechanism is one section of a conveyor mechanism which is capable of moving the leaves removed by the defoliating mechanism from the defoliating section to the baling station.

At the baling station on the vehicle frame the tobacco leaves conveyed to the baling station by a second section of the conveying mechanism are loaded and secured within successive racks 16. For this purpose, there is provided at the baling station a rack loading and securing mechanism.

In the preferred apparatus, a rack handling mechanism is positioned on the vehicle frame at the rack handling station thereof for effecting movement of the racks loaded by the rack loading and securing mechanism away from the latter into a rack supporting device 28 which is preferably constructed so as to receive and support a plurality of loaded racks so that the loaded racks supported therein can be conveniently transported from the vehicle frame to the curing station. The present apparatus also provides an elevating mechanism for handling successive rack supporting devices 28 to facilitate their transportation to the curing station.

Rack

Figure 1:
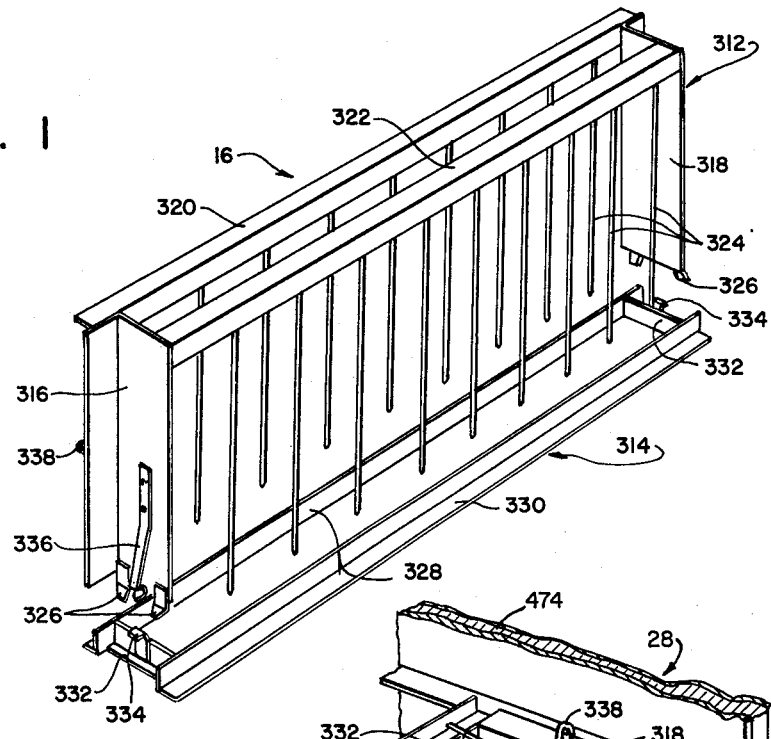
Figure 2:
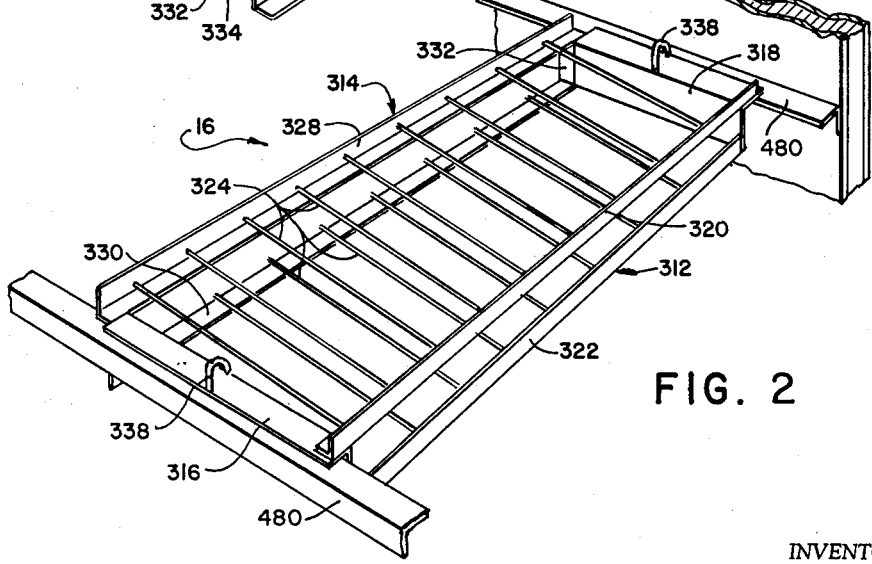

As best shown in FIGURES 1 and 2, each rack 16 utilized in connection with the present apparatus is preferably of the type disclosed in co-pending Wilson application Serial No. 116,368 which is hereby incorporated by reference into this disclosure. While the rack shown in the present drawings embodies the principles of the construction of the rack disclosed in the above-mentioned co-pending application, it is particularly dimensioned to cooperate with the rack loading and securing mechanism of the apparatus disclosed in Patent Number 3,083,517. To this end, each rack 16 includes a pair of cooperating sections 312 and 314 which are moved apart to permit leaves to be loaded therein and are moved into cooperating latched relationship to secure the loaded leaves in baled condition. In secured relation, the bale provides peripheral confinement to the leaves in bulk form loaded therein. Thus, the section 312 includes a U-shaped frame, the legs of which are formed by angular members 316 and 318. These leg members are interconnected by a pair of transversely extending angle iron frame members 320 and 322.

As best shown in FIGURES 1 and 2 the ends of the angle iron frame member 322 are rigidly secured, as by welding or the like, in abutting relation to the lower corners of the vertical flanges of the angular leg members 316 and 318. In a like manner, the ends of the angle iron member 320 are secured, as by welding or the like, to the adjacent outwardly extending flanges of the angle iron leg members 316 and 318. Rigidly secured to the inwardly extending flanges of the angle iron frame members 320 and 322 is a plurality of prongs or elongated rods 324. The prongs 324 are spaced apart approximately 3¼ inches with the prongs secured to the angle iron member 320 spaced intermediate the prongs of the angle iron member 322. Preferably, these prongs extend at a slight angle with respect to the plane of the associated flanges so as to permit deflection of their outer ends in supporting relation to the other section 314 of the rack. Preferably, the outer ends of the prongs are sharpened to a blunt point to facilitate their penetration through the leaves.

Each of the leg members 316 and 318 is provided at the end thereof opposite from the angle iron members 320 and 322 with a pair of guide spaced plates 326 arranged to guidingly cooperate with the outwardly extending ends of a pair of angle iron frame members 328 and 330 forming a portion of the rack section 314. The angle iron members 328 and 330 of the section 314 are rigidly interconnected in spaced relation by end frame members 332 to which are secured spring latch members 334 arranged to cooperate with spring latch members 336 adjustably secured to the leg members 316 and 318 of the section 32. It will be seen that when the two sections are moved together the cooperating latch members will hold the sections in interengaged secured relation with respect to each other. It will also be noted that an apertured handling lug or inverted U-shaped rod 338 is fixedly secured to the central portion of the outwardly extending flange of each leg member 316 and 318.

Rack Supporting Device

Figure 3:
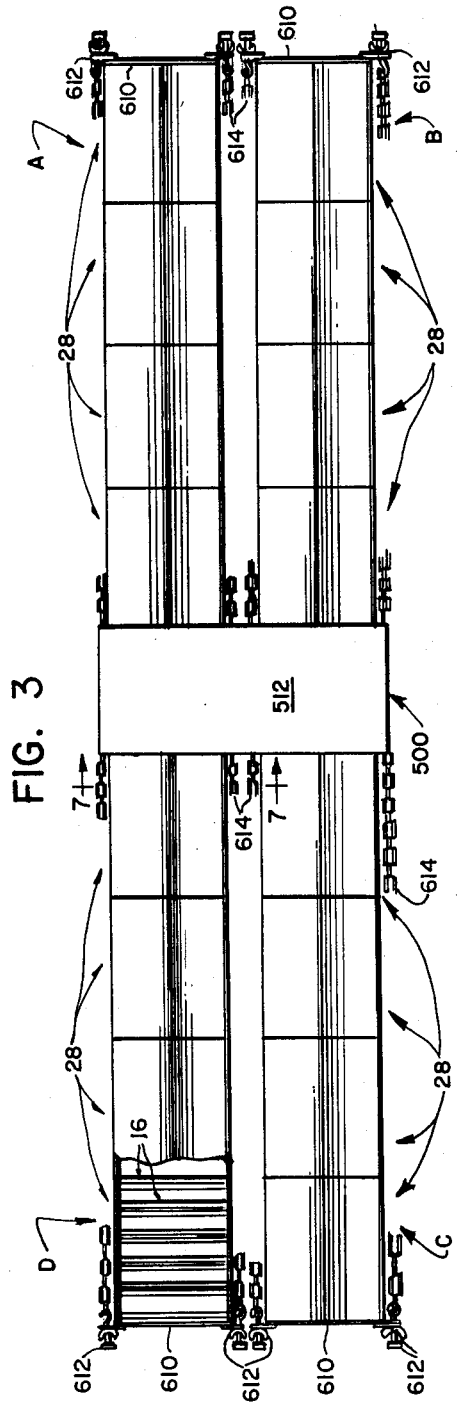
FIGURE 3 is a plan view of a curing barn embodying the principles of the present invention.

The rack supporting device 28 is best shown in FIGURE 3 and comprises a pair of side walls 474 which are preferably constructed of laminated panels, as for example, inner and outer panels of masonite having suitable insulating material therebetween. The side walls are connected along their lower edges by spaced floor slats 476 which serve to retain the lower portions of the side walls in rigid spaced relation. The upper ends of the side walls are connected by a pitched roof 478 which is likewise preferably made of heat insulated laminated panels. Mounted on the interior surface of each of the side walls 474 is a pair of vertically spaced horizontally extending angle irons 480 which serve as rail means to engage and support the outwardly extending flanges of the leg members 316 and 318 of the rack sections 312. As shown, the device 28 is open at both ends and the side walls 474 are of such a dimension as to receive approximately five abutting racks 16 mounted on the rails 480 extending therethrough. Since there are two cooperating rails provided at two different vertical levels, the entire device 28 as shown, is capable of receiving ten loaded racks.

Preferably, the lower edge surface of the side walls are provided with longitudinally extending runners 482 to aid in handling the device. The rack supporting device 28 is thus adapted to engage on the upper surface of the U-shaped frame of the elevating mechanism and when the latter is disposed in its upper position, one open end of the container will be disposed in a position facing the rack handling station on the vehicle frame.

Curing Barn

As best shown in FIGURES 3–9, the curing barn of the present invention preferably comprises a fixed housing section, generally indicated at 500, arranged to cooperate with a plurality of rack supporting devices 28. As best shown in FIGURE 6, the fixed housing section 500 includes a rectangular foundation wall 502 which may be conveniently constructed of cinder block or the like, suitably mounted on concrete footings formed in the ground, the ground itself providing a bottom floor, indicated at 504, for the housing section 500. Mounted on the upper surface of the foundation wall 502 is a lower intermediate floor 506 of any conventional construction. Extended upwardly from the foundation wall in surrounding relation to the floor 506 is a pair of parallel side walls 508 interconnected at their ends by a pair of ends walls 510. These walls may also be of any suitable construction and preferably they are made up of individual laminated panels, each panel of which comprises a pair of spaced outer sheets of wall material such as masonite or the like, having suitable insulating material, such as fiberglass or the like, disposed therebetween in a manner similar to the panels of the device 28.

Figure 4:
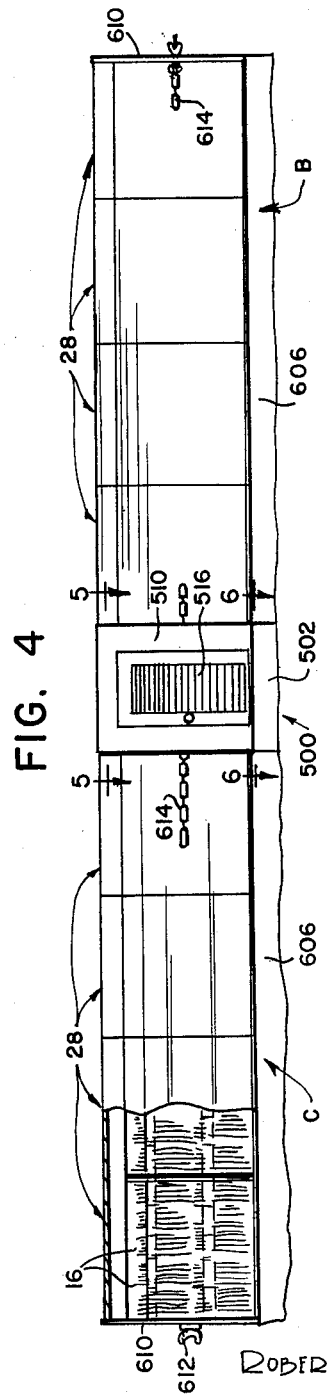
FIGURE 4 is an elevational view of the curing barn shown in FIGURE 3.
Figure 8:
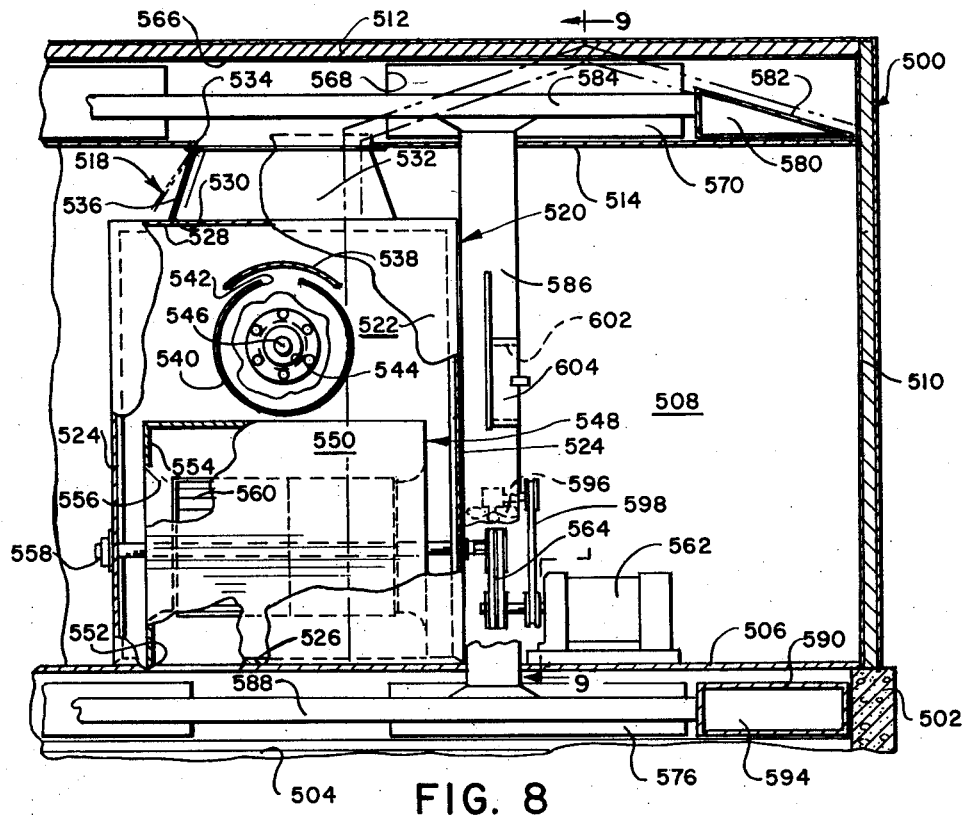
FIGURE 8 is an enlarged sectional view taken along the line 8—8 of FIGURE 5.
Figure 9:
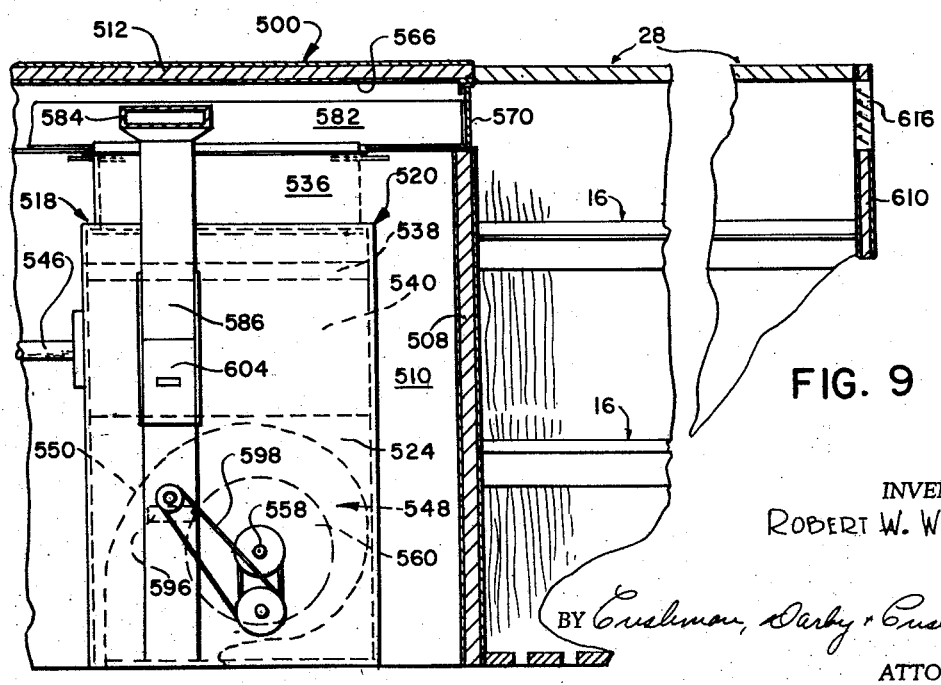
FIGURE 9 is a sectional view taken along the line 9—9 of FIGURE 8.

The upper edges of the side and end walls are interconnected and covered by a conventional roof construction indicated at 512. While the roof is shown in FIGURES 3, 8 and 9 as being pitched, it will be understood that it may be horizontal and any desired pitch angle may be provided thereon for purposes of drainage and the like. Mounted in vertically spaced relation to the roof 512 is an upper intermediate floor 514 of any suitable construction. Preferably, one of the end walls 510 is provided with a louvred door 516 as shown in FIGURE 4, which permits fresh air to enter the central portion of the housing section between the intermediate walls 506 and 514.

Disposed in the central portion of the housing section 500 between the floors 506 and 514 is a furnace assembly unit 518 which constitutes a source of heated circulating air. As best shown in FIGURES 8 and 9, the furnace unit 518 comprises a rectangular casing or housing 520 which preferably includes front and rear housing walls 522, side walls 524 and bottom and top walls 526 and 528 respectively, all of the walls being of sheet metal construction and secured to the exterior of a suitable skeletonized frame. Formed in the top wall 528 is a rectangular inlet opening 530 to which is secured a duct structure comprising a pair of trapezoidal shaped end walls 532 having the lower ends thereof secured adjacent the ends of the inlet opening 530 in the top wall 528 and their upper ends disposed adjacent a smaller inlet opening 534 formed in the upper intermediate floor 514 of the housing section 500. Extending between the inclined upright edges of each of the trapezoidal end walls 532 is a damper plate 536 which is pivoted at its upper end about a horizontal axis for movement into different positions of adjustment with respect to the associated opening which constitutes a fresh air inlet for the furnace unit.

Mounted in the upper central portion of the housing 520 and extending between the front and rear walls 522 thereof is a fixed deflector or baffle plate 538 which is of concavo-convex arcuate configuration with the concave side thereof facing downwardly. Disposed beneath the baffle plate 538 is a cylindrical burner casing 540 closed at its rear end and formed along its upper portion with an elongated rectangular combustion gas outlet opening 542 disposed in vertically spaced relationship beneath the baffle plate 538. The portion of the housing front wall 522 enclosing the front end of the burner casing is provided with acentral circular opening 544 within which a burner assembly 546 may be introduced into the burner casing and maintained therein so that the controls thereof extend outwardly of the front wall of the main housing. The opening 544 also provides an inlet through which air to support combustion may enter the burner casing 540. The burner assembly 546 may be of any conventional construction capable of burning either gas, oil, kerosene, or other conventional fuels.

Mounted within the lower central portion of the housing 520 is a fan casing 548 which includes an outer volute peripheral wall 550 having one end secured to the bottom wall 526 of the housing adjacent one end of an outlet opening 552 formed therein and extending therefrom upwardly around and then downwardly to the opposite end of the opening 552. The sides of the volute peripheral wall 550 are enclosed by side walls 554, each of which has an inwardly extending circular opening 556 formed therein. Mounted between the side walls 524 of the housing 520 and extending through the axis of the openings 556 is a shaft 558 having a fan rotor 560 fixed thereto within the casing 548 between the side walls 554. The fan rotor 560 is of conventional construction preferably of the type adapted to receive air axially through the axial openings 556 and convey the same radially outwardly through the outlet opening 552. It will be noted that the shaft 558 extends outwardly through one housing side wall 524 and is driven by a variable speed electric motor 562, or other suitable means, such as an internal combustion engine, through a suitable belt and pulley assembly 564.

Referring now more particularly to FIGURE 5, it will be noted that the space within the housing section 500 defined by the roof 512 and the upper intermediate floor 514 defines an inlet chamber 566 and the associated portion of each side wall 508 is provided with a pair of horizontally spaced openings 568 positioned to communicate with the open upper end portion of a rack supporting device 28. Each of the openings 568 is provided with a horizontally pivoted damper plate 570 for controlling the communication of the associated opening 568 with the inlet opening 534 in the floor 514.

As best shown in FIGURE 6, the ground floor 502 and lower intermediate floor 506, define an outlet chamber 572 which communicates through the lower intermediate floor 506 with the outlet opening 552 of the fan casing 548. Each side of the foundation wall 502 is provided with a pair of horizontally spaced rectangular openings 574 disposed vertically below the associated pair of openings 568, each being controlled by a horizontally pivoted damper plate 576.

The above described structure constitutes the main source of heated circulating air which is of suitable capacity to accomplish the more demanding procedure of drying the tobacco leaves. The present curing barn also includes a separate circuit for separately accomplishing the yellowing procedure which does not require high heat or fast air flow. To this end, each side wall 508 of the housing 500 includes a small opening 578 of triangular configuration adjacent the outer end of each opening 568. Air flow through each of the openings 578 is controlled by a horizontally pivoted triangular damper plate 580, as shown in FIGURE 5. The pair of openings 578 adjacent each end wall 510 is intercommunicated by a triangular duct section 582 and the duct sections 582 are intercommunicated by a longitudinally extending duct section 584.

A round vertical duct section 586 has its upper end communicatively connected with the longitudinal duct section 584 and extends downwardly through the intermediate floors 514 and 506 and has its lower end communicatively connected intermediate the ends of a longitudinally extending duct section 588 disposed within the outlet chamber 572. The ends of the duct section 588 are communicatively connected intermediate the ends of a pair of duct sections 590, each of which has the ends thereof communicating with openings 592 formed in the foundation walls adjacent the outer ends of the associate pair of openings 574. As before, a horizontally pivoted damper plate 594 is mounted in each opening 592 to control the flow of air therethrough.

Mounted in the vertical duct section 586 is a suitable forced air source, such as a fan 596, which may be conveniently driven by the motor 562 through an appropriate belt and pulley assembly 598 connected with the fan shaft through a right angle drive assembly 600 or the like. Preferably, the belt and pulley assembly 598 is such that it may be conveniently disconnected or otherwise clutched to control the drive to the fan 596. The vertical duct section 586 also has a fresh air opening 602 formed therein above the fan which is controlled by a vertically sliding damper plate 604.

As best shown in FIGURE 7, a pair of elongated horizontally spaced foundation walls 606 of cinder block or the like suitably mounted in concrete footings extends horizontally outwardly on opposite ends of each pair of openings 574 and 592. As before, the ground defines a bottom floor 608 extending between each pair of spaced walls 606. The upper surfaces of each pair of elongated foundation walls 606 are disposed so as to receive the runners 482 on the side walls 474 of a rack supporting device 28, so that the roof 478 of the device will cover the associated upper openings 568 and 578 in the housing section side walls 508.

As can be seen from FIGURES 3 and 4, the foundation walls 606 are such that they will support in aligned condition a plurality of the devices 28 disposed in end-to-end abutting relation. Rather than utilizing the edge wall constructions of the device as an abutting means in the manner shown, the edges of the devices may be provided with suitable sealing means (not shown) so as to effect a substantial sealing engagement between the same and with the associated side wall of the fixed housing section 500. In this way, each of the devices 28 defines a housing section of the curing barn. When a sufficient number of devices has been placed in end-to-end relation, the outer end of the outermost device is closed by a back plate or panel 610. The back panel 610 is provided with a pair of horizontally spaced chain engaging crank fittings 612, each of which is arranged to engage one end portion of a chain 614, the opposite end of which is secured to the fixed housing section 500. It will be seen that by actuating the crank fittings 612, the back panel 610 and all of the aligned devices 28 will be moved into substantial sealing engagement with respect to each other and with respect to the associated side wall 508 of the housing section 500.

It will be noted that the arrangement described above is such that the air flow from each group of end-to-end aligned devices 28 can be independently controlled by means of the dampers provided. The associated pair of elongated foundation walls 606, the included ground floor 608, and the lower surface of the leaves mounted within the devices 28 define a lower duct in the housing sections which communicates with the outlet chamber 572 through openings 574 and 592 under the control of the associated dampers 576 and 594. The air in this lower duct of the devices 28 passes vertically upwardly through the tobacco leaves mounted within each and the upper surfaces of the tobacco leaves define with the roofs 478 of the devices an upper duct which is controllably closed at one end by the back panel 610 and communicates at its other end with the associated openings 568 and 578 in the housing section 500 under the control of the associated dampers 570 and 580. Thus, the air in the upper duct is returned to the inlet chamber 566 for re-circulation through the furnace assembly 518.

For the purpose of controllably closing one end of the upper duct provided by the devices 28, each back panel 610 is provided with a louvre assembly 616. As shown in FIGURE 9, the louvre assembly 616 is of the type which is normally biased into a closed position and which is openable in one direction only. Thus the louvres are adapted to automatically open when a predetermined pressure is built up in the upper duct of the devices 28 to permit outward movement of air therethrough but will also prevent movement of outside air into the upper duct.

*Curing Barn Operation and Curing Method*

The curing barn is such that the furnace assembly 518 is capable of accomplishing the entire curing operation. It will be noted that the furnace assembly 518 efficiently utilizes the heat input by discharging all of the products of combustion into the circulated air through the opening 542 of the burner casing 540. When it is desired to utilize the furnace assembly 518 to accomplish the yellowing procedure of the curing operation, the speed of the fan rotor 560 may be adjusted, if necessary, by adjusting the speed of the motor 562, to obtain a relatively slow flow of air and the thermostat (not shown) controlling the burner assembly 546 is turned down within a temperature range of approximately 100° to 110° F. Of course, when the furnace assembly 518 is used in this way, the drive to the fan 596 is disconnected and all of the dampers 580 and 594 associated with the yellowing circuit are closed. During the yellowing procedure, the circulated air is heavily laden with moisture and this moisture can be expelled by opening the fresh air dampers 536. In this way, a greater pressure is created in the associated upper duct of the device 28 and the louvre assembly 616 will open to permit exhaust of the humid air.

In the operation of the furnace assembly 518 in its normal use during the drying procedure, the speed of the fan 560 may be adjusted, if necessary, to give a flow of air of approximately 30 cubic feet per minute and the thermostat for the burner is set to operate at a temperature range of 160° to 165° F. Here again, the moisture in the circulated air can be controlled by opening the fresh air dampers 536.

Bulk tobacco curing of the present type, as distinguished from curing of tobacco hands tied on sticks, depends upon air pressure to obtain circulation. It is for this reason that the essentials indicated above relating to the manner in which the leaves are compressed into the racks are required. That is, the leaves must be aligned generally in one direction to provide vertical flow paths for the air under pressure. Moreover, there must be general uniformity in the density of the leaves compressed within all of the racks in order to insure that air will flow through all of the vertical paths provided. That is, if one or two racks are loosely loaded while one or two other racks in the same room section are tightly loaded, the air will tend to follow the path of least resistance and substantially no flow will pass through the tightly loaded leaves. Also for this reason the racks themselves must be placed in the room section so that there are no open vertical passages provided which would divert the flow of air from passing between the paths provided between the leaves. This means that the racks must be supported at their ends so that they are substantially sealed with respect to the walls of the room section supporting the same, as by the supporting rails, that the sides of adjacent racks must be substantially sealed, as by abutting engagement or suitable resilient seals, not shown, and that the inner and outer sides of the innermost and outermost racks must be substantially sealed with respect to the adjacent side wall of central housing section and the back panel respectively, as by abutting engagement or suitable resilient seals, not shown.

In regard to the rate of air flow, it should be noted that the rate of air flow during the yellowing procedure and the rate of flow during the drying procedure will not normally be in direct relation to the speed of the fan 560. Bearing in mind that a green newly defoliated leaf is from 6 to 8 times the size of a cured leaf, it can be readily seen that the green leaves during the yellowing step will offer considerably more resistance to flow than the same leaves during the drying step. This change in size is mostly in the thickness of the leaves as a result of loss of moisture and therefore the flow paths between the leaves will tend to open more and more as the curing progresses. Thus, it is possible to utilize a constant speed for the fan and the variations in the flow required for the yellowing and drying steps will be provided more or less automatically on the average as a result of the lessening of resistance to flow due to leaf shrinkage.

While the furnace assembly 518 may be utilized without the yellowing circuit to accomplish the entire curing operation, the present invention contemplates the utilization of the yellowing circuit in an improved method whereby the more expensive furnace assembly 518 is utilized to the greatest possible efficiency, namely, to accomplish the drying procedure while the yellowing circuit is simultaneously employed to accomplish the yellowing procedure. It will be noted that the duct system of the yellowing circuit is disposed within the inlet and outlet chambers 566 and 572 in heat exchange relation to the air therein which should provide sufficient temperature to the yellowing circuit air in the range of 100 to 110 F. Moreover, a relatively inexpensive fan unit 596 will provide the necessary relatively slow air flow required. With respect to the maintenance of the air of the yellowing circuit at the proper temperature, it will be noted that the majority of the yellowing circuit is in heat exchange relation to the main circuit within the upper and lower chambers which are insulated from ambient conditions and maintained at a relatively constant operating temperature. Therefore, the heat transfer characteristics are generally constant. However, variations will be introduced when the temperature of the ambient air intake varies. In order to eliminate the need for continued manual adjustment of the damper plate 604, an automatic adjustment mechanism (not shown) operable to open and close the damper 604 in response to variations in the air temperature within the yellowing circuit can be provided.

A specific illustrative embodiment of the present method will now be described in relation to FIGURES 3 and 4 wherein the separate groups of devices 28 are designated by the reference characters A, B, C and D. Bearing in mind that the total harvesting procedure requires approximately four or five passes through the tobacco field wherein the lower, intermediate and upper leaves of the stalks are defoliated respectively, and that the period between such passes is approximately one week, the following schedule specifically exemplifies the principles of the present method, wherein the days of the week are arbitrarily chosen and designated with consecutive numbers for the sake of convenience.

On Monday 1, sections A and B are loaded. On Tuesday 2, the furnace assembly 518 is utilized in the manner described above to provide a relatively low heat, low flow circulation through sections A and B to begin the yellowing process of the tobacco in sections A and B. On Wednesday 3, the yellowing of the tobacco in sections A and B is continued. On Thursday 4, the dampers 570 and 576 to sections A and B are adjusted to provide a relatively high temperature, high flow air circulation to commence the drying process and during the same day sections C and D are loaded. On Friday 5, the drying of the tobacco leaves in sections A and B is continued and the dampers 580 and 592 associated with sections C and D are opened and the fan 596 is drivingly connected so as to provide a low heat, low flow air circulation through the tobacco therein to commence the yellowing process. On Saturday 6 the drying of the tobacco in sections A and B is continued and completed, and the yellowing of the tobacco in sections C and D is continued. On Sunday 7 the yellowing circuit is closed down and the dampers 570 and 576 associated with sections C and D are adjusted to commence the drying process therein while sections A and B remain closed from air circulation.

On Monday 8, sections A and B are unloaded and reloaded and the drying process in sections C and D is continued. On Tuesday 9, the dampers 580 and 594 in sections A and B are adjusted to begin the yellowing process while the drying process is continued in sections C and D and completed. On Wednesday 10 the yellowing of the tobacco in sections A and B is continued with the use of the furnace unit 518 and sections C and D are unloaded with the yellowing circuit closed. On Thursday 11, the dampers 570 and 576 associated with sections A and B are adjusted to begin the drying process and sections C and D are loaded. On Friday 12 the drying process is continued in sections A and B and the dampers 580 and 594 associated with sections C and D are adjusted to begin the yellowing process. On Saturday 13 the drying of the tobacco in sections A and B is continued and completed and the yellowing of the tobacco in sections C and D is continued and completed. On Sunday 14, the dampers 570 and 576 associated with sections A and B remain closed along with the yellowing circuit, while the dampers 570 and 576 associated with sections C and D are adjusted to begin the drying process. On Monday 15, sections A and B are unloaded and re-loaded and the drying process is continued in sections C and D. On Tuesday 16, the yellowing of the tobacco in sections A and B is begun with the yellowing circuit and the drying of the tobacco in sections C and D is continued and completed.

The above schedule gives a clear indication of a continuous cycle of use of a central heated circulating air source, such as provided by the furnace assembly 418, in which the source is utilized most efficiently while at the same time providing for a minimum labor on Sunday or one day out of seven.

*Modifications*

The present invention contemplates modification of the rack structure itself in such a way that a plurality of racks may be mounted in vertically stacked relation and end-to-end relation to form a portion of the housing section of the curing barn. Such a variation is illustrated in FIGURES 10 and 11 and embodies a rack construction generally indicated at 664. As shown, the rack 664 includes four separable sections, a pair of end wall sections 666, a prong section 668, and a side closure section 670. Each end wall section 666 is preferably of rectangular configuration and is made up of a pair of spaced outer plate members having a suitable insulating material disposed therebetween. The vertical dimension of the end wall section is of a size generally greater than the vertical dimension of the leaves supported in the rack 664 in the size range of between 28 to 32 inches, a preferably dimension being 30 inches.

Each edge of each end wall section 666 is provided with means for substantially sealingly engaging the opposite edge of a similar rack. To this end, it will be noted that the upper edge is formed with a longitudinally extending ridge 672 therein, while the lower edge is formed with a mating groove 674 therein. In like manner, one vertical edge of each side wall section 666 is provided with an elongated ridge 676, while the other is provided with a cooperating vertically extending groove 678.

Mounted on the interior surface of each end wall section 666 is a horizontally extending spring clip 680 having opposite ends thereof provided with hooked portions 682 disposed in a position spaced just inwardly from the adjacent vertical edge thereof.

The prong rack section 668 includes an elongated member 684 preferably of channel construction having a pair of horizontally spaced rows of prongs 686 fixedly secured, as by welding or the like, to the upper and lower flanges thereof, the prongs of one row being staggered with respect to the prongs of the other row. Mounted on each of the members 684 is a latch clip 688 arranged to cooperatively engage within an associated hooked end portion 682 of the end wall section spring clips 680. The side closure rack section 670 comprises an elongated member 690 preferably of channel construction having a latch clip 692 mounted on each end thereof for cooperation with the other hooked end portions 682 of the spring clips 680.

It will be understood that the rack sections are initially assembled by engaging either the prong rack section 668 or the side closure rack section 670 into cooperative relation with respect to the end wall sections 666. To this end, the interior surface of the end wall sections 666 are preferably provided with two pairs of vertically spaced guide plates 693 defining inwardly converging surfaces for guiding the associated end of the rack section members 684 and 690 into proper latched relation and for preventing relative vertical movement when in latched position. It will be seen that the prong rack section 668 with the end wall sections 666 latched thereto is comparable to the rack section 312 previously described while the side closure section 670 is comparable to the section 312 previously described.

Accordingly, the rack 664 may be utilized in this way in lieu of the rack 16 previously described. Moreover, with the rack 664 it is possible to initially assemble the side closure section 670 with the end wall sections 666 in latched relation. When the rack 664 is thus utilized, the rack section receiving and tobacco leaf guide units 342 and 622 need not provide end walls since the end wall sections 666 serve to confine the tobacco leaves at the ends.

The sectionalized structure of the rack 664 provides the advantage that the various separate sections may be stored separately thus alleviating the storage problem on the vehicle frame of the apparatus of Patent Number 3,083,517 to a considerable extent. The rack sections may be initially secured together in the manner indicated above in a simple manner during the operation of the apparatus of the patent.

It will be noted that the lower edges 674 of the rack end wall sections 666 provide a means for supporting the rack on a horizontal surface, the prongs 686 being spaced vertically thereabove a distance sufficient to enable the tobacco leaves to be supported with their lower surfaces above such horizontal supporting surface.

Referring now more particularly to FIGURE 11, it will be noted that a plurality of loaded racks 664 can be mounted in vertically stacked relation in which case the lower edges 674 of the end wall sections 666 of the upper racks are disposed in substantially sealing engagement with the upper edges 672 of the end wall sections of the lower racks. Any suitable means may be provided for securing the racks in stacked relation, as for example cooperating locking elements 694 and 696 of the window latching type mounted adjacent the upper and lower edges on the exterior surface of each end section 666. In a like manner, a plurality of racks may be mounted in end-to-end abutting relationship in which case the vertical edge 676 of one rack is disposed in abutting relation to the vertical edge 678 of the adjacent rack. Again, any suitable means may be provided for securing the racks in end-to-end relation such as cooperating locking elements 698 and 700 of the window latching type securing to the outer surface of each and adjacent the vertical edges thereof.

As best shown in FIGURE 11, it can be seen that ten racks 664 mounted in two vertically stacked rows of five racks disposed in end-to-end relation form vertical walls of a housing section similar to the side walls 474 of the devices 28. In will be understood that a suitable roof construction (not shown) may be mounted on the upper edges of the upper racks and that the lower edges of the lower rows of racks may be mounted in cooperating relation to a wall structure defining a lower duct section in the manner previously described.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A portable device for supporting defoliated tobacco leaves in bulk form for transportation and curing comprising a pair of upright imperforate walls and an imperforate roof extending between the upper portion of said walls, a plurality of racks, rail means on said walls extending in parallel horizontal relation substantially throughout the longitudinal extent of said walls for slidably receiving and supporting said plurality of racks in side-by-side operative abutting relation, each of said racks including relatively movable sections which together provide a rectangular structure having means for peripherally confining a batch of leaves in compressed bulk from disposed with their flat surfaces vertical and with a substantial portion of the flat surfaces thereof in substantially parallel vertical relation and spaced horizontal prong means extending between the confining means adapted to be in piercing relation to the leaves in a direction perpendicular to the parallel flat surfaces thereof so as to provide interior support for the leaves while permitting vertical flow of air between the leaves within the confining means, the rectangular structure of each of said racks including spaced pairs of opposed sides, one pair of opposed sides having downwardly facing surface means for slidably engaging said rail means, the longitudinal extent of said imperforate walls and the rail means thereon being related to the longitudinal extent of said one pair of opposed sides of each rack so that a plurality of said racks are supported in longitudinal coextensive relation with said walls when the other pair of opposed sides of adjacent racks are in operative abutting relation, the upper surface of the leaves supported in said racks being adapted for defining with said roof an open ended duct permitting horizontal flow of air therethrough, said walls and roof being of a size and weight such as to be conveniently transported through a tobacco field so that successive racks with newly defoliated tobacco leaves therein can be mounted on said rail means during such transportation through the field, said walls and roof having means at each of the ends thereof for substantially sealingly abutting the opposite end of a similar device so that said walls and roof with said plurality of filled racks mounted on said rail means in side-by-side relation coextensive with said walls is operable to form an exterior portion of a curing barn in which a circulating flow of heated air under pressure suitable to cure the tobacco leaves is established vertically through the leaves confined by said racks and horizontally through said open ended duct.

2. A device as defined in claim 1 wherein said rail means includes upper and lower pairs of parallel horizontally extending rails.

3. A device for supporting defoliated tobacco leaves in bulk form for transportation and curing comprising a pair of upright imperforate walls and an imperforate roof extending between the upper portion of said walls, means extending between said walls for supporting a multiplicity of tobacco leaves in bulk form therebetween substantially throughout the longitudinal extent thereof with the flat surfaces of said leaves extending vertically and with a substantial portion of the flat surfaces parallel so as to permit vertical air flow therethrough, the upper surfaces of said leaves being adapted for defining with said roof an open ended duct permitting horizontal flow of air therethrough, said walls and roof having means on each of the ends thereof for substantially sealingly abutting the opposite end of a similar device, said walls comprising a plurality of rectangular wall sections secured together in vertically stacked and end-to-end relation, said tobacco leaf supporting means comprising spaced horizontally extending prong means directly connected between each pair of spaced corresponding wall sections.

4. A tobacco leaf supporting rack comprising separable rack sections which together in cooperating relation provide means for peripherally confining a batch of leaves disposed with their flat surfaces vertical and with a substantial portion of the flat surfaces thereof in substantially vertical parallel relation and spaced prong means extending horizontally within said peripheral confining means in a direction perpendicular to the parallel flat surfaces thereof so as to provide interior support for the leaves while permitting vertical flow of air between the leaves within said confining means, said confining means including imperforate end walls extending generally parallel to said prong means, said end walls having a vertical dimension adapted to be greater than the general vertical dimension of the batch of leaves supported therebetween, each edge of each end wall having means thereon for substantially sealingly engaging the opposite edge of the corresponding end wall of a similar rack.

5. A rack as defined in claim 4 wherein securing means is mounted on the exterior surface of each end wall adjacent each edge thereof for lockingly engaging with cooperating securing means on the adjacent end wall edge of a similar rack disposed in substantial sealing engagement therewith.

6. A tobacco curing barn comprising a fixed housing section defining an air inlet and a vertically spaced air outlet, heating means in said fixed housing section between said inlet and said outlet, means in said fixed housing section for creating an air circulation from said inlet to said outlet in heat exchange relation to said heating means, an elongated housing section extending horizontally outwardly from said fixed housing section, said elongated housing section including uper and lower ducts extending longitudinally therethrough, one of said ducts communicating with said inlet, the other of said ducts communicating with said outlet, at least the portion of said elongated housing section disposed above said lower duct comprising a plurality of movable housing units, each housing unit comprising a pair of upright imperforate walls and a generally imperforate roof extending between the upper portion of said walls, means extending between said walls for supporting a multiplicity of tobacco leaves in bulk form therebetween substantially throughout the longitudinal extent thereof with the flat surfaces of said leaves extending generally vertical and a substantial portion thereof parallel so as to permit vertical air flow therethrough and the upper surface of said leaves being adapted for defining with said roof a portion of said upper duct permitting horizontal flow of air therethrough, each of said movable housing units being open at both ends, means for mounting said group of movable housing units in substantially sealingly abutting end-to-end relation with respect to each other with one end of the group in substantially sealingly abutting relation to said fixed housing section and means for closing the other end of the group of end-to-end housing units.

7. A device as defined in claim 6 wherein said tobacco supporting means comprises a plurality of racks having spaced horizontally extending prong means for supporting tobacco leaves therein and wherein said walls have horizontally extending rail means thereon supporting said racks therebetween.

8. A device as defined in claim 6 wherein said walls comprise a plurality of rectangular wall sections secured together in vertically stacked and end-to-end relation, and wherein said tobacco leaf supporting means comprises spaced horizontally extending prong means directly connected between each pair of spaced corresponding wall sections.

9. A tobacco curing barn comprising a fixed housing section defining an air inlet and a vertically spaced air outlet, heating means in said fixed housing section between said inlet and said outlet, means in said fixed housing section for creating an air circulation from said inlet to said outlet in heat exchange relation to said heating means, an elongated housing section extending horizontally outwardly from said fixed housing section, said elongated housing section including upper and lower ducts extending longitudinally therethrough, one of said ducts communicating with said outlet, at least the portion of said elongated housing section disposed above said lower duct comprising a plurality of movable housing units, each housing unit comprising a pair of upright imperforate walls and a generally imperforate roof extending between the upper portion of said walls, rail means on said walls extending in parallel horizontal relation substantially throughout the longitudinal extent of said walls for slidably receiving and supporting a plurality of racks of the type having means for peripherally confining a batch of leaves disposed with their flat surfaces in substantially vertical relation and a substantial portion thereof parallel and spaced horizontal prong means extending between the confining means in piercing relation to the leaves in a direction perpendicular to the parallel flat surfaces thereof so as to provide interior support for the leaves while permitting vertical flow of air between the leaves within the confining means, the upper surfaces of the leaves supported in said racks being adapted for defining with said roof an open ended duct permitting horizontal flow of air therethrough, each of said movable housing units being open at both ends, means for mounting said group of movable housing units in substantially sealingly abutting end-to-end relation with respect to each other with one end of the group in substantially sealingly abutting relation to said fixed housing section and means for closing the other end of the group of end-to-end housing units.

10. A tobacco curing barn comprising a fixed housing section defining at least two separate air inlets and two separate air outlets spaced vertically with respect to said inlets, heating means in said fixed housing section between said inlets and outlets, means in said fixed housing section for creating an air circulation from said inlets to said outlets in heat exchange relation to said heating means, at least two elongated housing sections extending horizontally outwardly from said fixed housing section, each of said elongated housing sections including upper and lower ducts extending longitudinally therethrough, one of said ducts communicating with one of said inlets, the other of said ducts communicating with one of said outlets, at least the portion of each of said elongated housing sections disposed above the associated lower duct comprising a plurality of movable housing units, each housing unit comprising a pair of upright generally imperforate heat insulating walls and a generally imperforate roof extending between the upper portion of said walls, means extending between said walls for suporting a multiplicity of tobacco leaves therebetween substantially throughout the longitudinal extent thereof with the flat surfaces of said leaves extending generally vertical and a substantial portion thereof parallel so as to permit vertical air flow therethrough, the upper surfaces of the leaves being adapted for defining with said roof a portion of the upper duct of the associated elongated housing section, each of said movable housing units being open at both ends, means for mounting said group of movable housing units in abutting end-to-end relation with respect to each other with one end of the group in abutting relation to said fixed housing second and means for closing the other end of the group of end-to-end housing units.

11. A device as defined in claim 10 wherein said tobacco supporting means comprises a plurality of racks having spaced horizontally extending prong means for supporting tobacco leaves therein and wherein said walls have horizontally extending rail means thereon supporting said racks therebetween.

12. A device as defined in claim 10 wherein said walls comprise a plurality of rectangular wall sections secured together in vertically stacked and end-to-end relation, and wherein said tobacco leaf supporting means comprises spaced horizontally extending prong means directly conected between each pair of spaced corresponding wall sections.

13. A tobacco curing barn comprising a fixed housing section defining at least two separate air inlets and two separate air outlets spaced vertically with respect to said inlets, heating means in said fixed housing section between said inlets and outlets, means in said fixed housing section for creating an air circulation from said inlets to said outlets in heat exchange relation to said heating means, at least two elongated housing sections extending horizontally outwardly from said fixed housing section, each of said elongated housing sections including upper and lower ducts extending longitudinally therethrough, one of said ducts communicating with one of said inlets, the other of said ducts communicating with one of said outlets, at least the portion of each of said elongated housing sections disposed above the associated lower duct comprising a plurality of movable housing units, each housing unit comprising a pair of upright generally imperforate heat insulated walls and a generally imperforate roof extending between the upper portion of said walls, rail means on said walls extending in parallel horizontal relation substantially throughout the longitudinal extent of said walls for slidably receiving and supporting a plurality of racks of the type having means for peripherally confining a batch of leaves disposed with their flat surfaces in substantially vertical relation and with a substantial portion thereof parallel and spaced horizontal prong means extending between the confining means in piercing relation to the leaves in a direction perpendicular to the parallel flat surfaces thereof so as to provide interior support for the leaves while permitting vertical flow of air between the leaves within the confining means, the upper surfaces of the leaves supported in said racks being adapted for defining with said roof and open ended duct permitting horizontal flow of air therethrough, each of said movable housing units being open at both ends, means for mounting said group of movable housing units in abutting end-to-end relation with respect to each other and with one end of the group in abutting relation to said fixed housing section and means for closing the other end of the group of end-to-end housing units.

14. A tobacco curing barn comprising a fixed housing section defining at least two pairs of cooperating vertically spaced inlets and outlets, heating means in said fixed housing section between said inlets and outlets, means in said fixed housing section for creating an air circulation from said inlets to said outlets in heat exchange relation to said heating means, means in said fixed housing section for separately controlling the flow of heated air through each pair of cooperating inlets, at least two elongated housing sections extending horizontally outwardly from said fixed housing section, each of said elongated housing sections including a pair of spaced upright imperforate wall surfaces, a generally imperforate roof extending between the upper portion of said wall surfaces, an imperforate floor extending between the lower portion of said wall surfaces, means extending between said wall surfaces for supporting a multiplicity of tobacco leaves therebetween with the flat surfaces of said leaves extending generally vertical and with a substantial portion thereof parallel so as to permit vertical airflow therethrough, the upper surfaces of said leaves being adapted for defining with said roof an upper duct permitting horizontal flow of air therethrough which is closed at one end against inward flow, the lower surfaces of said leaves defining with the floor a lower duct closed at one end, the open end of the upper and lower ducts of each elongated housing section communicating with one pair of said spaced inlets and outlets whereby the circulation of heated air through each housing section is independent of the circulation of heated air through the other housing section so as to permit the simultaneous yellowing of the leaves in one section with a relatively low heat and air flow and the drying of the leaves in the other section with a relatively high heat and air flow.

15. A tobacco curing barn comprising a fixed housing section defining at least two pairs of cooperating vertically spaced inlets and outlets, heating means in said fixed housing section between said inlets and outlets, means in said fixed housing section for creating an air circulation from said inlets to said outlets in heat exchange relation to said heating means, means in said fixed housing section for separately controlling the flow of heated air through each pair of cooperating inlets and outlets, at least two elongated housing sections extending horizontally outwardly from said fixed housing section, each of said elongated housing sections including a pair of spaced upright imperforate wall surfaces, a generally imperforate roof extending between the upper portion of said wall surfaces, an imperforate floor extending between the lower portion of said wall surfaces, rail means on said wall surfaces extending in parallel horizontal relation substantially throughout the longitudinal extent of said wall surfaces for slidably receiving and supporting a plurality of racks of the type having means for peripherally confining a batch of leaves disposed with their flat sides in substantially parallel vertical relation and spaced horizontal prong means in piercing relation to the leaves in a direction perpendicular to the flat surfaces thereof so as to provide interior support for the leaves while permitting vertical flow of air between the leaves within the confining means, the upper surfaces of said leaves being adapted for defining with said roof an upper duct permitting horizontal flow of air therethrough which is closed at one end, the lower surfaces of said leaves defining with the floor a lower duct closed at one end, the open end of the upper and lower ducts of each elongated housing section communicating with one pair of said spaced inlets and outlets whereby the circulation of heated air through each housing section is independent of the circulation of heated air through the other housing section so as to permit the simultaneous yellowing of the leaves in one section with a relatively slow heat and air flow and the drying of the leaves in the other section with relatively high heat and air flow.

16. In a tobacco curing barn, the combination comprising a barn section including a bottom floor, a roof, walls extending between said bottom floor and roof enclosing the same, an upper intermediate floor structure between said walls defining with said roof an upper air chamber, a lower intermediate floor structure between said walls defining with said bottom floor a lower air chamber, said intermediate floor structures having openings therein, a housing within said walls between said intermediate floor structures, said housing having upper and lower openings communicating respectively with the openings in said upper and lower intermediate floor sections, fan means in said housing having the output side thereof communicating with the lower opening in said housing, burner means between the upper opening in said housing and the input side of said fan means, means for controllably communicating a supply of combustion air to said burner means, said walls having openings therein communicating with said upper and lower air chambers, and damper means for controlling the flow of air through the opening communicating with said lower chamber.

17. The combination as defined in claim 16 including a second barn section extending horizontally outwardly from said first mentioned barn section for receiving and supporting in the central portion thereof a plurality of tobacco leaves, said second housing section defining duct spaces above and below the tobacco leaves supported therein, said duct spaces being communicated respectively with the wall openings communicating with said air chambers.

18. The combination as defined in claim 16 including a third barn section extending horizontally outwardly from said first mentioned barn section for receiving and supporting in the central portion thereof a second plurality of tobacco leaves, said third housing section defining duct spaces above and below the tobacco leaves supported therein, the duct spaces of said third housing section being communicated respectively with said air chambers, and second damper means for controlling the communication of said third housing section duct spaces with said air chambers separate from the control of the communication of the second housing section duct spaces therewith.

19. The combination as defined in claim 16 wherein said second housing section includes a plurality of units mounted in end-to-end relation, each of said units including spaced vertical imperforate side walls having spaced tobacco leaf piercing and supporting prong means extending horizontally therebetween.

20. The combination as defined in claim 19 wherein said prong means is connected directly to said side walls.

21. The combination as defined in claim 19 wherein said prong means is connected directly to a plurality of peripheral rack frames, said side walls having parallel rail means thereon supporting said rack frames.

22. The combination as defined in claim 16 wherein said second housing section includes a plurality of housing section units mounted in end-to-end relation, each unit being open at its ends and including spaced imperforate side walls and an imperforate roof extending between the upper portion of said side walls, said side walls having horizontal rail means thereon for supporting a plurality of tobacco supporting racks therebetween.

23. An air heating and circulating system for curing tobacco supported in bulk form of substantially uniform density in a plurality of racks of the type each of which includes relatively movable sections which together provide means for horizontally peripherally confining a batch of leaves with their flat surfaces disposed generally vertically and with a substantial portion of their flat surfaces generally parallel and spaced horizontal prong means extending within the peripheral confining means in piercing relation to the leaves in a direction generally perpendicular to the parallel flat surfaces thereof so as to provide interior support for the leaves while permitting vertical flow of air between the leaves within the confining means, said system comprising: means defining a duct communicating with the lower surfaces of the leaves; means defining a duct communicating with the upper surfaces of the leaves; housing means between said ducts including an inlet communicating with one of said ducts and an outlet communicating with the other of said ducts; a burner casing within said housing means having a burner assembly therein, said burner casing having an air inlet communicating the interior thereof with the atmopshere exterior of said housing means to permit fresh air within said casing to support combustion, said burner casing having an outlet communicating the interior thereof with the interior of the housing means to permit the products of combustion to pass into said housing means; fan means disposed within said housing means with the pressure side thereof communicating with said housing means outlet and the suction side thereof communicating with said burner casing outlet and said housing means inlet to thereby establish an air flow circuit in which the air from the fan means passes through said housing means outlet, through said other duct, vertically through said tobacco leaves, through said one duct, through said housing means inlet, past said burner casing and then back to said fan means; means for introducing a controlled amount of fresh air into the circuit on the suction side of said fan means; and means for discharging from said one duct to the atmosphere air in the circuit.

24. An air heating and circulating system as defined in claim 23 wherein said last-mentioned means comprises a louvre assembly movable into an open position in response to a predetermined differential presure between the adjacent air in the circuit and atmospheric air to permit discharge of the air in the circuit and movable into a closed position in response to a differential pressure below said predetermined differential pressure to prevent passage of atmospheric air into said one duct.

25. An air heating and circulating system as defined in claim 23 including means defining a separate air flow circuit between said ducts and through said leaves, and means for alternately communicating said housing means between said ducts and said separate circuit defining means between said ducts.

26. An air heating and circulating system as defined in claim 23 wherein said duct communicating with the upper surfaces of said leaves constitutes said one duct and communicates with said housing means inlet.

27. An air heating and circulating system for curing tobacco suported in bulk form of substantially uniform density in a plurality of racks of the type each of which includes relatively movable sections which together provide means for horizontally peripherally confining a batch of leaves with their flat surfaces disposed generally vertically and with a substantial portion of their flat surfaces generally parallel and spaced horizontal prong means extending within the peripheral confining means in piercing relation to the leaves in a direction generally perpendicular to the parallel flat surfaces thereof so as to provide interior support for the leaves while permitting vertical flow of air between the leaves within the confining means, said system comprising: means defining a duct communicating with the lower surfaces of the leaves; means defining a duct communicating with the upper surfaces of the leaves; first means communicable between said ducts for establishing a yellowing circuit of heated air flow through one of said ducts, the leaves and then the other duct having a relatively slow flow and a relatively low temperature, second means communicable between said ducts for establishing a drying circuit of heated air flow through one of said ducts, the leaves and the other of said ducts having a relatively fast flow and a relatively high temperature and means for alternately communicating said first and second means between said ducts.

28. A tobacco curing barn comprising a plurality of vertical walls defining a vertically confined space for receiving tobacco leaves, means extending between said walls for supporting a multiplicity of tobacco leaves in bulk form therebetween substantially throughout the horizontal extent of said space with the flat surfaces of said leaves extending generally vertically and a substantial portion thereof parallel so as to permit vertical air flow therethrough, means defining a duct communicating with the lower surfaces of the leaves, means defining a duct communicating with the upper surfaces of the leaves, housing means between said ducts including an inlet communicating with one of said ducts and an outlet communicating with the other of said ducts, a burner casing within said housing means having a burner assembly therein, said burner casing having an air inlet communicating the interior thereof with the atmospheric exterior of said housing means to permit fresh air to enter said casing so as to support combustion therein, said burner casing having an outlet communicating the interior thereof with the interior of said housing means to permit the products of combustion within said burner casing to pass into said housing means, fan means disposed within said housing means for establishing an air flow circuit in which air passes through said housing means outlet, through said duct, vertically through said tobacco leaves, through said housing means inlet, past said burner casing and then back through said housing means outlet, means for introducing a controlled amount of fresh air into the circuit on the suction side of said fan means, and means for discharging from said one duct to the atmosphere air in the circuit.

29. A tobacco curing barn as defined in claim 28 wherein said duct communicating with the upper surfaces of said leaves constitutes said one duct and communicates with said housing means inlet at one end thereof and wherein said means for discharging air in the circuit comprises an opening in the opposite end of said one duct defining means and means for controlling the flow of air through said opening.

30. A tobacco curing barn comprising a pair of horizontally spaced vertical walls, horizontal rail means secured to said walls for receiving and supporting in side-by-side abutting relation the ends of a pluality of racks of the type each of which includes relatively movable sections which together provide means for horizontally peripherally confining a batch of leaves with their flat surfaces disposed generally vertically and with a substantial portion of their flat surfaces generally parallel and spaced horizontal prong means extending within the peripheral confining means in piercing relation to the leaves in a direction generally perpendicular to the parallel flat surfaces thereof so as to provide interior support for the leaves while permitting vertical flow of air between the leaves within the confining means, means extending between the ends of said vertical walls for engaging the adjacent sides of the outermost racks of said plurality of racks so as to confine passage of air between the leaves supported in said racks, means defining a duct communicating with the lower surface of the leaves, means defining a duct communicating with the upper surfaces of the leaves, housing means between said ducts including an inlet communicating with one of said ducts and an outlet communicating with the other of said ducts, a burner casing within said housing means having a burner assembly therein, said burner casing having an air inlet communicating the interior thereof with the atmospheric exterior of said housing means to permit fresh air to enter said casing so as to support combustion therein, said burner casing having an outlet communicating the interior thereof with the interior of said housing means to permit the products of combustion within said burner casing to pass into said housing means, fan means disposed within said housing means for establishing an air flow circuit in which air passes through said housing means outlet, through said duct, vertically through said tobacco leaves, through said housing means inlet, past said burner casing and then back through said housing means outlet, means for introducing a controlled amount of fresh air into the circuit on the suction side of said fan means, and means for discharging from said one duct to the atmosphere air in the circuit.

References Cited in the file of this patent

UNITED STATES PATENTS

| | | |
|---|---|---|
| 211,210 | Barnett | Jan. 7, 1879 |
| 912,902 | Sharon | Feb. 16, 1909 |
| 969,031 | Bratkowski | Aug. 30, 1910 |
| 1,108,565 | Feuillette | Aug. 25, 1914 |
| 1,521,083 | Edward | Dec. 30, 1924 |
| 1,982,990 | Harris | Dec. 4, 1934 |
| 2,090,633 | Mayo | Aug. 24, 1937 |
| 2,114,942 | Sugg | Apr. 19, 1938 |
| 2,343,346 | Touton | Mar. 7, 1944 |
| 2,455,684 | Kirkpatrick | Dec. 7, 1948 |
| 2,475,568 | Moore | July 5, 1949 |
| 2,533,092 | Chestnutt | Dec. 5, 1950 |
| 2,551,215 | Lytton | May 1, 1951 |
| 2,798,496 | Jones | July 9, 1957 |
| 2,940,615 | Long et al. | June 14, 1960 |
| 2,989,057 | Touton | June 20, 1961 |
| 3,105,713 | Hassler | Oct. 1, 1963 |
| 3,110,326 | Hassler | Nov. 12, 1963 |